(12) United States Patent
Kim

(10) Patent No.: US 7,177,430 B2
(45) Date of Patent: Feb. 13, 2007

(54) DIGITAL ENTROPING FOR DIGITAL AUDIO REPRODUCTIONS

(75) Inventor: Jason Seung-Min Kim, San Jose, CA (US)

(73) Assignee: Portalplayer, Inc., San Jose, CA (US)

( * ) Notice: Subject to any disclaimer, the term of this patent is extended or adjusted under 35 U.S.C. 154(b) by 880 days.

(21) Appl. No.: 10/000,700

(22) Filed: Oct. 31, 2001

(65) Prior Publication Data

US 2003/0081780 A1 May 1, 2003

(51) Int. Cl.
*H04K 1/02* (2006.01)
*H04N 7/167* (2006.01)
*G06K 9/36* (2006.01)
*G06K 9/46* (2006.01)

(52) U.S. Cl. ................ 380/252; 380/200; 382/200

(58) Field of Classification Search ............... 380/252, 380/269; 713/200; 704/200.1
See application file for complete search history.

(56) References Cited

U.S. PATENT DOCUMENTS 5,083,224 A * 1/1992 Hoogendoorn et al. ....... 360/60
5,497,154 A * 3/1996 Komamura ................. 341/131
6,145,081 A * 11/2000 Winograd et al. .......... 713/200
6,209,094 B1 * 3/2001 Levine et al. ............... 713/176
6,219,634 B1 * 4/2001 Levine ..................... 704/200.1
6,288,747 B1 * 9/2001 Avalos et al. ............... 348/485
6,425,098 B1 * 7/2002 Sinquin et al. ............. 714/699
2002/0027994 A1* 3/2002 Katayama et al. .......... 380/269

* cited by examiner

*Primary Examiner*—Nasser Moazzami
*Assistant Examiner*—Arezoo Sherkat
(74) *Attorney, Agent, or Firm*—Pillsbury Winthrop Shaw Pittman LLP

(57) ABSTRACT

The present invention provides a system and method for introducing white noises into a digital audio signal so that there is progressive and cumulative degradation in audio quality after each successive reproduction of the audio sound signal in a fashion analogous to analog audio reproduction. The invention provides a white noise generator, and a digital entroping unit. In a preferred embodiment, the white noise generator is implemented by a hardware random number generator. The digital entroping unit controls the magnitude of white noise desired based on a random number generated by the random number generator, and adds the white noise to the input audio sound signal to produce a degraded audio sound signal. The magnitude of white noise can be controlled by using various masking and formatting of random number data.

51 Claims, 5 Drawing Sheets

D3 ⟶ 1010110001011001

GENERATE RANDOM NUMBER ⟶ 0010110010010101

ONE BIT LSB WHITE NOISE ⟶ 0000000000000001

ADD WHITE NOISE TO D3 ⟶ 1010110001011010

GENERATE RANDOM NUMBER ⟶ 1001110000110110

ONE BIT LSB WHITE NOISE ⟶ 0000000000000000

ADD WHITE NOISE TO D4 ⟶ 1010110010001010

FIG. 4(B)

DIGITAL ENTROPING FOR DIGITAL AUDIO REPRODUCTIONS

FIELD OF THE INVENTION

This invention relates generally to a digital data manipulation. More specifically, the invention relates to a technique for progressive degradation of a digital audio signal in reproduction.

BACKGROUND OF THE INVENTION

The combination of computer technology and digital audio recording technology has made it possible to reproduce or create copies of audio recordings with the same or almost the same quality as the original recordings on media such as CD (compact disc) or DAT (digital audio tape). The ability to recreate digital audio recordings, for example, music, without losing its original quality, can be a threat to copyright owners of the music and can seriously affect revenue generation for the music industry.

Thus, the Audio Home Recording Act (AHRA) of 1992 (Title 17, Chapter 10, of the United States Code) was enacted to prevent unrestrained and uncontrolled reproduction of music recordings published by the music industry. The AHRA includes provisions to place certain built-in limitations in digital music that are designed to prevent unauthorized reproduction of music recordings. For example, in order to avoid violation of the AHRA, an audio device must comply with the serial copy management system (SCMS), which requires the configuration that uses a single protection bit. Under the SCMS, the single bit protection is reset in the original master copy, and is set in all other second or higher generation copy versions in order to prevent unauthorized reproductions off the second or higher generation copy versions.

The existing techniques that implement the SCMS often creates ineffective and inefficient solutions to prevent unauthorized recordings. In particular, it is overly simple and inflexible due to the single bit protection scheme. The use of a single bit protection is also often vulnerable to attempts to circumvent it, and is often deciphered relatively easily because modern computers are powerful and well-equipped to break the code and decipher single bit protection schemes. Once a single bit protection scheme is known, it is relatively easy to neutralize the whole protection scheme and make reproductions of the original music recordings at will.

Although there are more sophisticated encryption schemes to prevent unauthorized reproduction such as cryptographic watermarking and private copy protection scheme, they are also vulnerable to circumvention and may be deciphered by using personal computers whose processing power continues to escalate with time. In addition, cryptographic encryption schemes can be prohibitively expensive if the encryption is strong enough to prevent all unauthorized decryption attempts.

The AHRA exempts analog recordings because analog recordings will inherently degrade each successive reproductions or copying. However, the analog exemption does not apply to popular audio recording media, such as CD, because they use a digital format for recordings, not the analog format.

In view of the foregoing, it is highly desirable to provide a flexible, cost-efficient copy protection mechanism in compliance with the Audio Home Recording Act. It is also desirable to provide a mechanism that would be applicable to popular digital recording media, such as CD and DAT, that would prevent unauthorized reproduction while being strong enough to prevent circumvention or deciphering.

SUMMARY OF THE INVENTION

The present invention provides a system and method for introducing white noise into a digital audio data stream so that there is progressive quality degradation after each reproduction of the audio signals in a fashion analogous to analog audio reproduction. The invention may include a white noise generator, a microprocessor, and a digital entroping unit coupled to the white noise generator. In one aspect of the invention, the digital entroping unit is embedded in the microprocessor as part of its firmware program.

In a preferred embodiment, the invention uses a hardware based random number generator as the white noise generator. Typically, an incoming audio signal comprises a plurality of digital data sampled at different time points, and the random number generator generates a random random number comprising sixteen (16) bits for each audio data sample. A masking or scaling data is applied to each random number generated in order to select a predetermined number of bits from the random number. The predetermined number of bits (the strength of the white noise) is then added to the original audio date to create degraded audio data. The predetermined number of bits is determined based on the level of desired degradation of the audio data. In particular, various desired degradation levels (of hisses and pops) can be achieved by using different predetermined algorithms for modifying the masking or scaling data. Because of the randomness of the white noise being added, it is nearly impossible to recover the original audio signal from the degraded audio output.

In one aspect of the invention, the predetermined number of bits of the random number is selected so that there is approximately 3 dB degradation of the input digital audio signal as a result of digital entroping. At 3 dB output noise, there are noticeable differences or degradations from the original audio signal. Repeated reproductions or copying of the audio data with 3 dB degradation will result in cumulative degradation in the quality of the audio data as the digital entroping process repeatedly injects additional white noise into the next generation copies. Eventually, the audio data will be degraded to such an extent that after multiple generation of reproductions, it becomes unrecognizable or unenjoyable to the listener. Thus, an audio quality degradation similar to analog reproduction can be achieved for digital audio data.

In another aspect of the invention, the randomness of the digital entroping process is in timing of adding a noise number to the input audio data. The invention determines whether a noise number is to be added to the input audio data or not. The noise number is then added to certain audio data randomly selected based upon an algorithm using random numbers.

In accordance with the invention, multiple attempts to reproduce or copy the multi-generation audio signal will result in further degradation in the quality of the audio signal as the digital entroping process is applied multiple times, thereby increasing the randomness or entropy of the audio data. After multiple reproductions the audio data will be so degraded that it becomes unrecognizable or unacceptable to the listener. An audio quality degradation similar to analog reproduction can thus be achieved.

BRIEF DESCRIPTION OF THE DRAWINGS

For a better understanding of the invention, reference should be made to the following detailed description taken in conjunction with the accompanying drawings, in which:

FIG. 4(A) illustrates the addition of a random number to digital audio data according to one embodiment of the invention in which a one (1) bit LSB white noise is added to the digital audio data D3 of FIG. 2(B);

FIG. 4(B) illustrates the addition of a random number to digital audio data according to one embodiment of the invention in which a one (1) bit LSB white noise is added to the digital audio data D4 of FIG. 2(B)

Like reference numerals refer to corresponding parts throughout the drawings.

DETAILED DESCRIPTION OF A PREFERRED EMBODIMENT

The invention is particularly applicable to on-line and it is in this context that the invention will be described. It will be appreciated, however, that the digital entroping unit in accordance with the invention has greater utility, such as to other types of digital audio applications. To understand the digital entroping in accordance with the invention, the basic process of the digital entroping and its operations will be described.

Overview—Digital Entroping

The invention introduces white noise into a digital audio signal in order to degrade the audio signal. White noise is a random noise whose noise spectral level (noise-power density) is uniform over a wide frequency range. Once the white noise is added to the input audio signal, it is nearly impossible to reverse the process and recover the original input audio signal because of the randomness of the white noise. The degree of degradation can be varied by changing the amount of the white noise that is added to the input audio signal. Because the ideal white noise, which requires an average power of infinity, does not exist in real life, the invention approximates the ideal white noise by using a random number (RND) generator. In a preferred embodiment, the invention may use a hardware based random number (RND) generator. For example, the random number generator may be constructed using linear feedback shift registers (LFSRs) on a PLL/VCO (phase locked loop/voltage controlled oscillator) based clock generator. In a preferred embodiment, the initial condition of the LFSRs are randomly determined by the analog electro-mechanical-conditions of the PLL/VCO circuits that are determined by the manufacturing and environmental parameters. A digital entroping system of the invention will now be described.

Digital Entroping System

Figure 1:
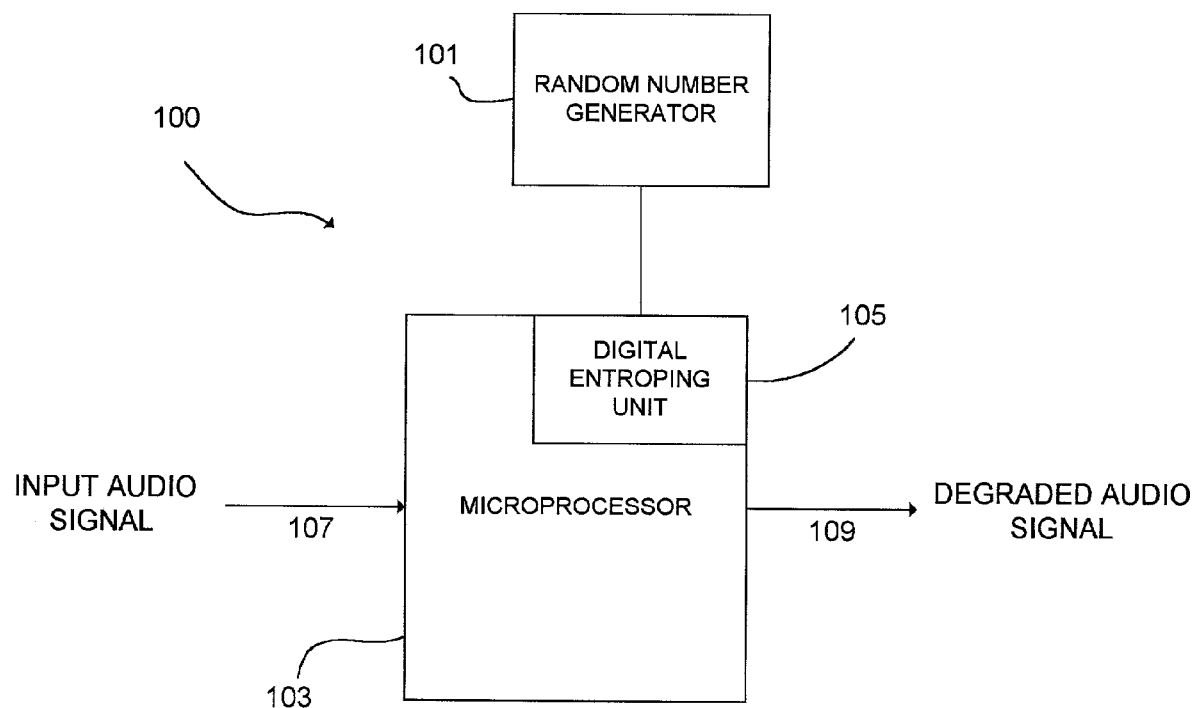
FIG. 1. is a block diagram illustrating a digital entroping system in accordance with one embodiment of the invention.

FIG. 1. is a block diagram illustrating a digital entroping system 100 in accordance with one embodiment of the invention. In FIG. 1, the digital entroping system comprises a random number generator 101, a microprocessor 103, and a digital entroping unit 105. In a preferred embodiment, the digital entroping unit 105 is embedded in the microprocessor 103 as part of its firmware program. In an alternate embodiment of the invention, the digital entroping unit 105 may be implemented using hardware such as an application specific integrated circuit (ASIC) or digital signal processor (DSP) instead of software, and may be external to the microprocessor 103. Also, in a preferred embodiment, the random number generator 101 is external to the microprocessor 103. However, it will be apparent to one skilled in the art that the random number generator can be implemented on chip as part of the microprocessor 103 or as a piece of software executable by the microprocessor 103.

In a preferred embodiment, the random number generator 101 is implemented as described in greater detail in co-pending U.S. patent application No. 09/847,982 entitled, "Random Number Generation Method and System," filed May 2, 2001, which is incorporated herein by reference. It will be appreciated by one skilled in the art that other suitable methods may be used to implement the random number generator 101. In yet another embodiment of the invention, software routines included in the firmware of the microprocessor 103 may be used as the random number generator 101. Also it will be apparent to one skilled in the art that any suitable psuedorandom number generator may be used in conjunction with the invention instead of a random number generator.

In one embodiment of the invention, the random number generator 101 generates sixteen (16) bit random numbers. However, it will be apparent to one skilled in the art that other sizes and structures may be used for the random number generator 101 so long as the generated random numbers do not exhibit periodicities, or a predictable algorithm.

In operation, an incoming audio signal 107 is received by the microprocessor 103. The microprocessor generates a random number and provides the random number and the input audio signal to the digital entroping unit 105 for digital entroping. After processing by the digital entroping unit 105, the microprocessor 103 produces a degraded audio output 109.

Figure 2A:
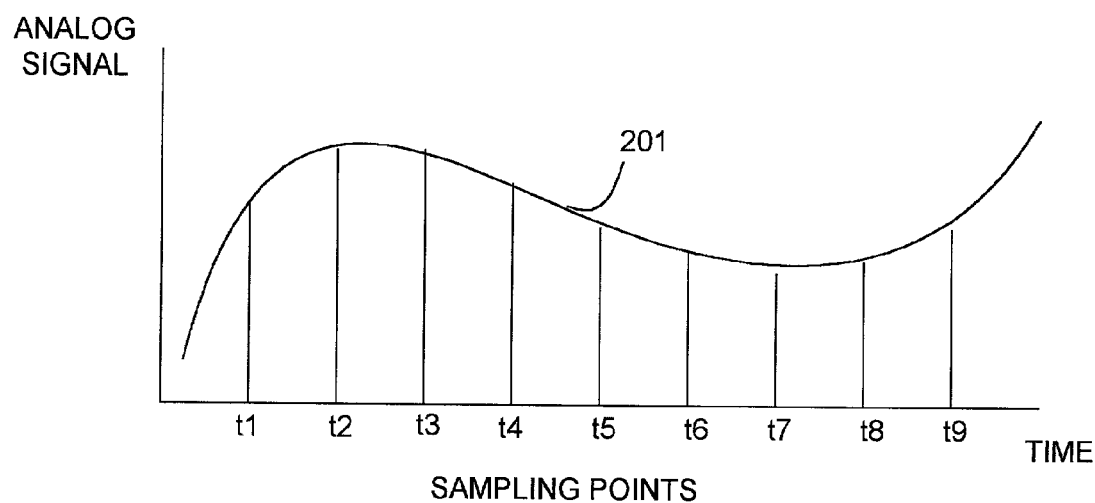
FIG. 2(A) illustrates an analog audio signal being sampled at times t1–t9.

In more detail, the incoming digital audio signal 107 is typically a modulated signal. Especially for music sounds, the original audio signal is analog in nature, and it must be converted into a digital signal using well-known modulation techniques for digital processing. FIG. 2(A) illustrates an analog audio signal 201 being sampled at times t1–t9. Since the original audio signal 201 is analog and analog signals are continuous, the digitization process includes sampling of the analog audio signal at some time intervals as is well-known in the art. The sampled points are then converted into digital data by a modulation technique. In a preferred embodiment, the audio signal is pulse code modulated (well-known in the art and therefore not described in detail). The analog to digital conversion may be carried out by an analog-to-digital converter (ADC) circuit or by software executable by a microprocessor.

Figure 2B:
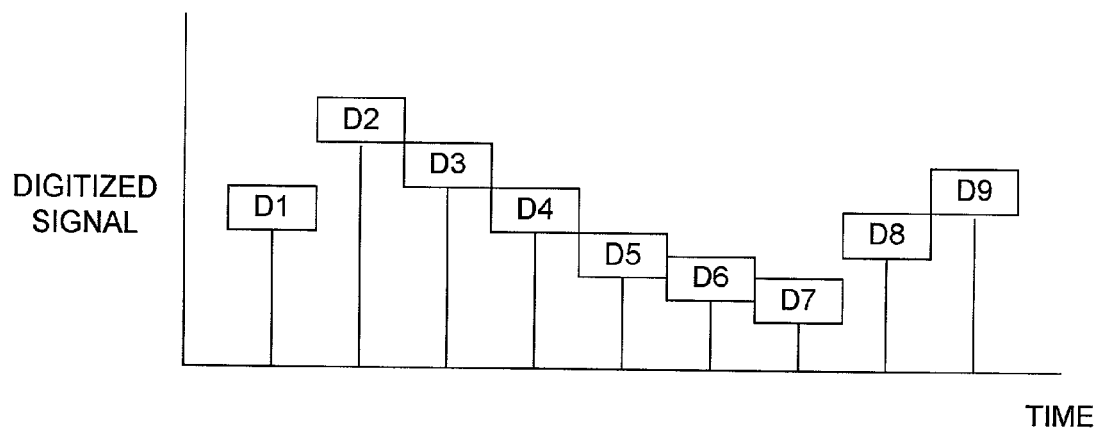
FIG. 2(B) illustrates pulse code modulated audio signal with samples D1–D9.

FIG. 2(B) illustrates pulse code modulated audio data D1–D9. In particular, at times t1–t9, the analog audio signal is converted to digital data D1–D9, respectively. D1–D9 each comprises a plurality of digital bits, depending on the quantization level as is well-known in the art. In a preferred embodiment, D1–D9 each comprise sixteen (16) bits. However, D1–D9 may have other number of digital bits as necessary without departing from the scope of the invention.

The pulse code modulated (PCM) audio signal may be further encoded for compression using a codec. Codecs are devices used to encode and decode (or compress and decompress) various types of data—particularly those that would otherwise use up inordinate amounts of storage, such as audio (sound) and video files. Although a PCM technique is described in connection with a preferred embodiment, it will be appreciated by one skilled in the art that other modulation techniques can be used to digitize the analog sound signal. For example delta modulation (DM) can also be used to convert the analog sound signal into digital signal. A digital entroping process for input audio signal 107 will now be described in more detail.

Digital Entropying Process

Figure 3:
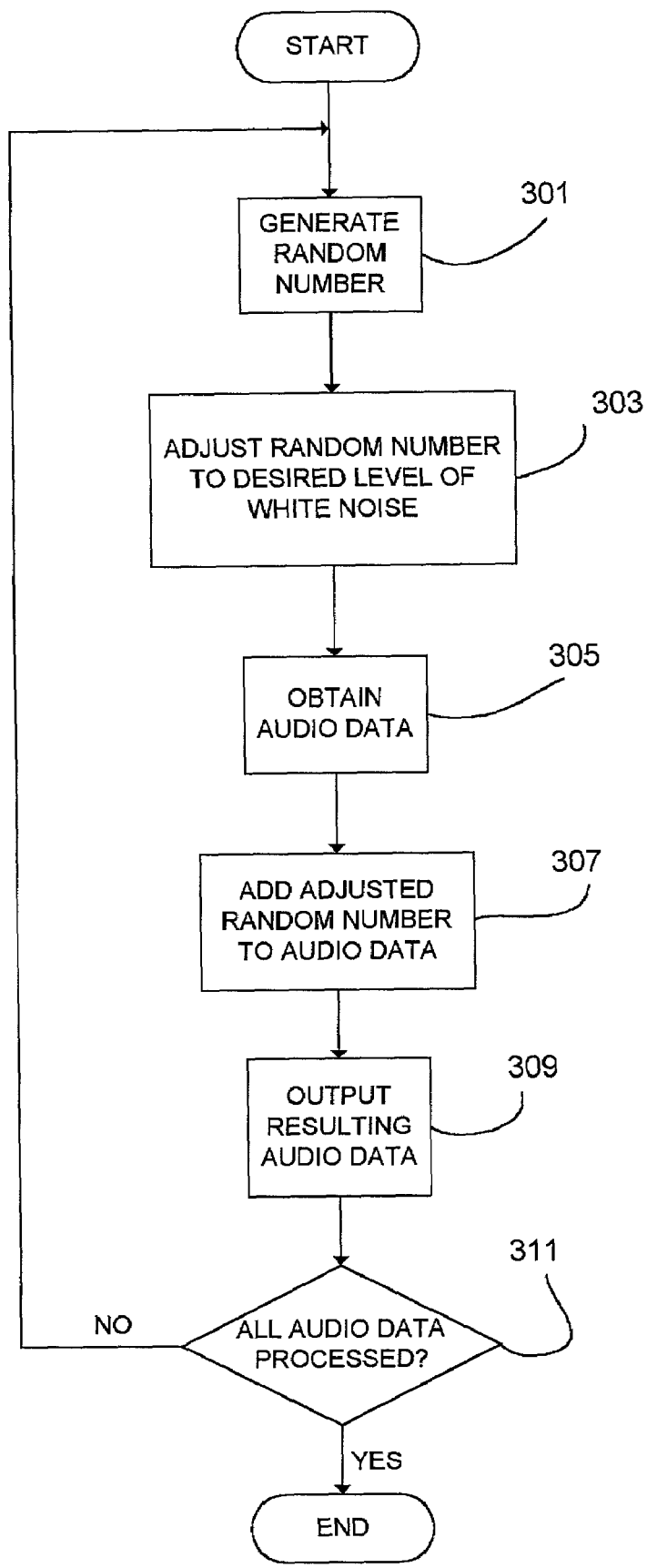
FIG. 3 is a flowchart illustrating a method for digital entroping for digital audio data in accordance with one embodiment of the invention.

FIG. 3 is a flowchart illustrating a method for digital entroping for digital audio input signal 107 in accordance with a embodiment of the invention. The digital audio input signal 107 comprises a plurality of digital data sampled at different time points as discussed above with reference to FIGS. 2(A) and 2(B). Each sampled digital data may comprise a plurality of digital bits.

Referring to FIG. 3, in step 301, a random number is generated by a random number generator discussed above. A new random number is generated for each new digital data such as D1–D9. In step 303, the generated random number is adjusted to the desired level of white noise by the digital entroping unit 105. In one embodiment of the invention, this is accomplished by applying a masking or scaling data to each random number generated in order to select a predetermined number of bits from the random number and by adding the predetermined number of bits to the audio data, or subtracting the predetermined number of bits from the audio data. The predetermined number of bits is determined based on the level of desired degradation of the audio data. The predetermined number may be a signed or unsigned integer or a fixed number. In particular, various desired degradation levels can be achieved by using different predetermined numbers and modifying the masking data. Table 1 below illustrates various masking/scaling data and corresponding levels of white noise.

TABLE 1

| White Noise | Masking Data | Operation |
| --- | --- | --- |
| 1 bit LSB noise | 0000000000000001 | (Random number) && (0x001) |
| 2 bit LSB noise | 0000000000000011 | (Random number) && (0x002) |
| 1 bit MSB noise | 1000000000000000 | (Random number) >> 15 & (0x001) |
| 2 bit MSB noise | 1100000000000000 | (Random number) >> 14 & (0x002) | where >> operator denotes a double right shift bit operation, & denotes a bitwise AND operation, and && denotes a logical AND operation.

Referring to Table 1, in one embodiment of the invention, one (1) bit LSB (least significant bit) white noise is added to the digital audio input 107 by applying the mask data 0000000000000001 to each data of the digital audio signal such as D1–D9. Alternatively, two (2) bit LSB white noise may be added by using the mask data 0000000000000011. Similarly, one (1) bit and two (2) bit MSB (most significant bit) white noises can be added by using 1000000000000000 and 1100000000000000, respectively. Although data in Table 1 uses sixteen (16) bit masking data, it will be apparent to one skilled in the art that the size of the making data can be varied without departing from the scope of the invention.

Thus, the level of white noise can be controlled using masking data as illustrated in Table 1. It will be appreciated by one skilled in the art that other levels and polarity of white noise can be achieved by using other suitable masking data and formats than those illustrated in Table 1.

Typically, the target degradation level is approximately 3 dB (decibel) and the appropriate masking data is selected to achieve the 3 dB degradation. The dB or decibel is a ratio of output power to input power expressed in logarithmic terms. At 3 dB, human ears can detect noticeable distortions or degradations from the original audio signal. Other levels of degradation may also be achieved by using different levels of white noise. For example, if the compliance with the AHRA requires a higher level of degradation than 3 dB, then three (3) bit or greater LSB white noise can be used as masking data in order to introduce a higher level of degradation into the input digital audio data.

In a preferred embodiment of the invention, step 303 is executed by the digital entroping unit 105. For this purpose, the digital entroping unit 105 may comprise means for selecting a predetermined number of bits of a random number generated and means for adding the predetermined number of bits of the random number to digital audio data D1–D7. Means for selecting a predetermined bits of a random number may further comprise means for formatting and applying masking/scaling data to the random number. In a preferred embodiment of the invention, means for selecting a predetermined number of bits of a random number and means for adding the predetermined number of bits are implemented by software. However, it will be apparent to one skilled in the art that means for selecting a predetermined number of bits of a random number and means for adding the predetermined number of bits may be implemented by hardware. For example, means for adding a predetermined number of bits of a random number may be implemented by an adder circuit. Also, means for applying masking data to the random number may be implemented using hardware circuitry such as a shift register and a multiplier in accordance with an alternate embodiment of the invention.

Referring back to FIG. 3, in step 305, digital audio data such as D1 is obtained by the digital entroping unit 105. The sequence of executing steps 303 and 305 may be varied without departing from the scope of the invention. For example, steps 303 and 305 may be executed simultaneously or in any order. In step 307, the adjusted random number is added to the input audio data. In a preferred embodiment of the invention, the steps 305 and 307 are performed for input audio data at a certain interval of time, or may be applied to each sampled digital data such as D1–D9.

In step 309, the result of the addition in step 307 is produced as output audio data. In step 311, it is determined whether all input audio data have been processed. If so, the digital entroping process completes. Otherwise, the process returns to step 301 to continue the digital entroping process. The digital entroping process completes when all digital data such as D1–D9 are processed. The output signal 109 comprises a plurality of digital data processed by the digital entroping process. At completion of the process, the randomness or the entropy of the output audio signal 109 increases and the quality of the output audio signal 109 decreases accordingly from its original quality depending on the level of the white noise introduced.

FIG. 4(A) illustrates the step 307 of FIG. 3 in greater detail according to one embodiment of the invention in which a one (1) bit LSB white noise is added to the digital audio data D3 of FIG. 2(B). The LSB of the random number being added is one (1) so that the input audio signal D3 is altered and degraded after the addition of the one bit LSB white noise as shown in FIG. 4(A). FIG. 4(B) illustrates the step 307 of FIG. 3 in greater detail according to one embodiment of the invention in which a one (1) bit LSB white noise is added to the digital audio data D4. Since the LSB of the random number generated is logic low (0) in this case, the addition of the one bit LSB white noise to D4 does not alter the input audio signal D4 as shown in FIG. 4(B).

Figure 5:
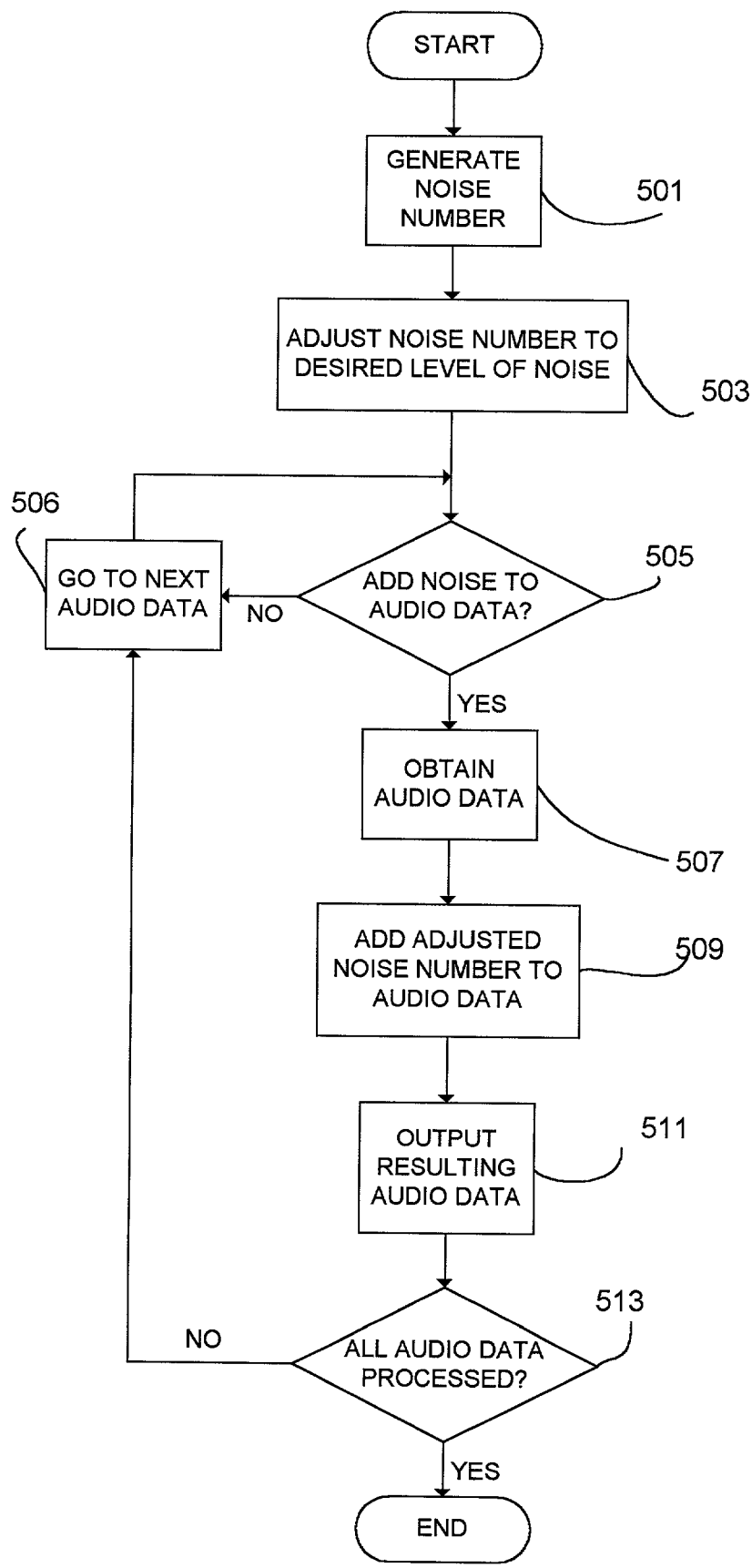
FIG. 5 is a flowchart illustrating a method for digital entroping for digital audio data in an alternate embodiment of the invention.

FIG. 5 is a flowchart illustrating a method for digital entroping for digital audio input signal 107 in an alternate embodiment of the invention. In step 501, a noise number is generated by any suitable number generator such as an adder. The noise number generated in step 501 may be a known number or a random number. In step 503, the number may be optionally adjusted to the desired level of noise by the digital entroping unit 105. As in step 303, this may be accomplished by applying a masking or scaling data to the number in order to select a predetermined number of bits from the number and by adding the predetermined number of bits to the audio data, or subtracting the predetermined number of bits from the audio data. The predetermined number of bits is determined based on the level of desired degradation of the audio data. The predetermined number may be a signed or unsigned integer or a fixed number.

In step 505, it is determined whether the adjusted noise number is to be added to the input audio data or not. In one embodiment of the invention, this decision may be made based on a random number. In one embodiment of the invention, a separate random number may be generated for this purpose. For example, an LSB or MSB of a random number may be used to make the determination of whether to add the adjusted number to the audio data. Alternatively, more complex algorithms for processing the random number may be used to make the determination as to which audio data should be added the noise number. In comparison to FIG. 3, the randomness of the digital entroping process of FIG. 5 is in timing of adding the noise number to the input audio data.

If it is determined in step 505 that the adjusted noise number is to be added to the input audio data, digital audio data such as D1 is obtained by the digital entroping unit 105 in step 507. Otherwise, the process continues to step 506. The sequence of executing steps 505 and 507 may be varied without departing from the scope of the invention. For example, the steps 505 and 507 may be executed simultaneously or in any order. If step 507 precedes step 505 in an alternate embodiment of the invention, step 509 may follow step 505.

In step 509, the adjusted noise number is added to the input audio data. In step 511, the result of the addition in step 509 is produced as output audio data. In step 513, it is determined whether all input audio data have been processed. If so, the digital entroping process completes. Otherwise, the process returns to step 506 to continue the digital entroping process. At completion of the process, the randomness or the entropy of the output audio signal 109 increases and the quality of the output audio signal 109 decreases accordingly from its original quality depending on the level of the white noise introduced.

When the routine in FIG. 3 or FIG. 5 is applied to the input audio signal 107 comprising digital audio data such as D1–D9, there may be or may not be a degradation on particular digital data D1–D9 depending on the random number generated for the particular input audio data or depending on the timing of adding a noise to the digital data. For example, D1, D3, D8, and D9 may be degraded while D2, D4–D7 may remain unaffected. But when observed as a whole, the digital entroping degrades the input audio signal D1–D9 to the extent that depends on the particular level of white noise being introduced. The level of degradation can be adjusted by applying different magnitude of white noise or masking/scaling data as illustrated in Table 1.

In principle, a degradation of an input audio data depends on the particular random number generated for the input audio data, and whether there will be a degradation or not is a random function. Because of this randomness, it is nearly impossible to determine which input data of the incoming audio signal 107 is degraded and which is not, and an effort to recover the original incoming audio signal 107 based on the degraded audio output 109 will thus fail. Even if a potential hacker is able to duplicate the exact architecture of the particular random number generator being used, it is still nearly impossible to recover the original incoming audio signal 107 from the degraded audio output 109 because the same random number generator produces a different number sequence each time it is activated and its outputs cannot be duplicated or predicted accurately unless the successive of the random number generator are also known.

In accordance with the invention, multiple attempts to reproduce or copy the multi-generation audio signal will result in further degradation in the quality of the audio signal as the digital entroping process in FIG. 3 or FIG. 5 is subsequently applied multiple times, thereby increasing the randomness or entropy of the audio data. Eventually the audio data will be so degraded after multiple reproductions that it becomes unrecognizable or unacceptable to the listener. For example, if there is a 3 dB degradation every time audio music data is reproduced, there will be approximately 9 dB degradation after three (3) reproduction attempts. At 9 dB, there is a significant quality degradation so that the quality of the audio music data is no longer enjoyable and the users are discouraged from further reproduction attempts. Thus, an audio quality degradation similar to analog reproduction can be achieved by properly adjusting the magnitude of white noise or noise number being added to the audio data.

The foregoing description, for the purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. The foregoing descriptions of preferred embodiments of the present invention are presented for purposes of illustration and description. They are not intended to be exhaustive or to limit the invention to the precise forms disclosed. It will be appreciated by those skilled in he art that changes in this embodiment may be made without departing from the principles and spirit of the invention, the scope of which is defined by the appended claims.

The invention claimed is:

1. A method for progressive degradation of a digital audio signal to prevent unauthorized reproduction of said digital audio signal comprising:
   generating white noise; and
   degrading said digital audio signal using said white noise to produce a degraded digital audio signal, so that a cumulative degradation effect is obtained during a successive reproduction of said digital audio signal.

2. The method of claim 1 wherein said white noise is a random number comprising a plurality of digital bits.

3. The method of claim 2 wherein said degrading comprises adding a predetermined number of said plurality of digital bits to said digital audio signal.

4. The method of claim 3 wherein said predetermined number is one (1).

5. The method of claim 4 wherein said adding said predetermined number of said plurality of digital bits comprises adding a least significant bit of said random number.

6. The method of claim 4 wherein said adding said predetermined number of said plurality of digital bits comprises adding a most significant bit of said random number.

7. The method of claim 3 wherein said predetermined number is two (2).

8. The method of claim 7 wherein said adding said predetermined number of said plurality of digital bits comprises adding two (2) least significant bits of said random number.

9. The method of claim 7 wherein said adding said predetermined number of said plurality of digital bits comprises adding two (2) most significant bits of said random number.

10. A computer program product for use in conjunction with a computer system, the computer program product comprising a computer readable storage medium and a computer program mechanism embedded therein, the computer program mechanism comprising:
   instructions for generating white noise, and
   instructions for degrading a digital audio signal using said white noise to produce a degraded digital audio signal so that a cumulative degradation effect is obtained during a successive reproduction of said digital audio signal.

11. The computer program product of claim 10 wherein said white noise is a random number comprising a plurality of digital bits.

12. The computer program product of claim 11 wherein said degrading comprises adding a predetermined number of said plurality of digital bits to said digital audio signal.

13. The computer program product of claim 12 wherein said predetermined number is one (1).

14. The computer program product of claim 13 wherein said adding said predetermined number of said plurality of digital bits comprises adding a least significant bit of said random number.

15. The computer program product of claim 12 wherein said predetermined number is two (2).

16. The computer program product of claim 15 wherein said adding said predetermined number of said plurality of digital bits comprises adding a least significant bit of said random number.

17. A method for progressive degradation of a digital audio signal, comprising: generating a random number;
   selecting a predetermined number of bits of said random number;
   adding said predetermined number of bits to said digital audio signal to produce a degraded digital audio signal, and
   wherein said predetermined number of bits of said random number is selected so that said degraded digital audio signal represents approximately 3 dB difference from said digital audio signal and,
   wherein the adding said predetermined number of bits provides cumulative degradation in successive reproductions of said digital audio signal.

18. The method of claim 17 wherein said predetermined number of bits comprises a least significant bit of said random number.

19. The method of claim 17 wherein said predetermined number of bits comprises a most significant bit of said random number.

20. A computer program product for use in conjunction with a computer system, the computer program product comprising a computer readable storage medium and a computer program mechanism embedded therein, the computer program mechanism comprising:
   instructions for obtaining a random number;
   instructions for selecting a predetermined number of bits of said random number; and
   instructions for adding said predetermined number of bits to said digital audio signal to produce a degraded digital audio signal, wherein said predetermined number is selected so that said degraded digital audio signal represents approximately 3 dB difference from said digital audio signal and,
   wherein the adding said predetermined number of bits provides cumulative degradation in successive reproductions of said digital audio signal.

21. The computer program product of claim 20 wherein said predetermined number of bits comprises a least significant bit of said random number.

22. The computer program product of claim 20 wherein said predetermined number of bits comprises a most significant bit of said random number.

23. A method for progressive degradation of digital audio signal comprising a plurality of pulse code modulated audio data, wherein said pulse code modulated audio data each comprises a plurality of bits, said method comprising:
   (a) generating a random number comprising sixteen (16) bits,
   (b) selecting a predetermined number of bits of said random number;
   (c) adding said predetermined number of bits to a first pulse code modulated audio data of said digital audio signal; and
   (d) repeating (a)–(c) until said plurality of pulse code modulated audio data are processed to produce degraded digital audio signal,
   whereby said degraded digital audio signal is degraded approximately 3 dB from said digital audio signal, wherein
   said digital audio signal is degraded by said approximately 3 dB for each successive reproduction of said digital audio signal.

24. The method of claim 23 wherein said predetermined number of bits comprise a least significant bit (LSB).

25. The method of claim 24 wherein said predetermined number of bits comprise a most significant bit (MSB).

26. A computer program product for use in conjunction with a computer system, the computer program product comprising a computer readable storage medium and a computer program mechanism embedded therein, the computer program mechanism comprising:
   (a) instructions for obtaining a random number comprising sixteen (16) bits;
   (b) instructions for selecting a predetermined number of bits of said random number;
   (c) instructions for adding said predetermined number of bits to a first pulse code modulated audio data of said digital audio signal; and
   (d) instructions for repeating (a)–(c) until said plurality of pulse code modulated audio data are processed to produce degraded digital audio signal, whereby said degraded digital audio signal is degraded approximately 3 dB from said digital audio signal, wherein said digital audio signal is degraded by said approximately 3 dB for each successive reproduction of said digital audio signal.

27. The computer program product of claim 26 wherein said random number is generated by a random number generator comprising linear feedback shift registers (LFSR).

28. The computer program product of claim 27 wherein said predetermined number of bits comprise a least significant bit (LSB).

29. The computer program product of claim 28 wherein said predetermined number of bits comprise a most significant bit (MSB).

30. A system for progressive quality degradation in reproduction of digital audio signal comprising a plurality of pulse code modulated audio data, said system comprising:
   a white noise generator to generate white noise;
   means for degrading said digital audio signal using said white noise, and
   whereby said degrading cumulatively affects reproduction of said digital audio signal so that repeated applications of said white noise to said digital audio signal progressively degrade said digital audio signal.

31. The system of claim 30 wherein said white noise comprises a random number generated by a random number generator comprising linear feedback shift registers (LFSR).

32. The system of claim 31 wherein said means for degrading said digital audio signal comprises means for adding said random number to said digital audio signal.

33. A system for progressive quality degradation in reproduction of digital audio signal comprising a plurality of pulse code modulated audio data, said system comprising:
   a random number generator to generate a random number; and
   a digital entroping unit for adding said random number to a pulse code modulated audio data, whereby wherein said random number is added during each reproduction of said digital audio signal and a cumulative degradation effect is obtained during successive reproductions of said digital audio signal.

34. The system of claim 33 wherein said random number generator comprises linear feedback shift registers (LFSR).

35. The system of claim 34 wherein said digital entroping unit further comprising means for adding a predetermined number of bits of said random number to said pulse code modulated audio data.

36. A method for degrading a digital audio signal input to prevent unauthorized reproduction of said digital audio signal comprising:
   generating white noise; and
   adding said white noise to said digital audio signal input to produce a digital audio signal output, wherein said white noise is added during each unauthorized reproduction of said digital audio signal and a cumulative degradation effect is obtained during successive reproductions of said digital audio signal.

37. The method of claim 36 wherein said white noise is a random number comprising a plurality of digital bits.

38. The method of claim 37 wherein a predetermined number of said plurality of digital bits is added to said digital audio signal input.

39. The method of claim 38 wherein said predetermined number is an integer or fixed number.

40. The method of claim 39 wherein said adding said predetermined number of said plurality of digital bits comprises adding a least significant bit of said random number.

41. The method of claim 40 wherein said adding said predetermined number of said plurality of digital bits comprises adding a most significant bit of said random number.

42. A method for progressive degradation of a plurality of digital audio data, comprising:
   generating a number;
   selecting a predetermined number of bits of said number;
   randomly selecting a subset of said plurality of digital audio data to which to add said predetermined number of bits; and
   adding said predetermined number of bits to a digital audio data to progressively produce a degraded digital audio data, wherein said predetermined number of bits is added during a successive reproduction of said digital audio data.

43. The method of claim 42 wherein said selecting comprises:
   generating a random number; and
   determining whether to add said predetermined number of bits based upon said random number.

44. The method of claim 43 wherein said predetermined number of bits of said number is selected so that said degraded digital audio data represents approximately 3 dB difference from said digital audio data.

45. The method of claim 44 wherein said predetermined number of bits comprises a least significant bit of said number.

46. The method of claim 44 wherein said predetermined number of bits comprises a most significant bit of said number.

47. A computer program product for progressive degradation of a plurality of digital audio data, the computer program product comprising a computer readable storage medium and a computer program mechanism embedded therein, the computer program mechanism comprising:
   instructions for obtaining a number;
   instructions for selecting a predetermined number of bits of said number;
   instructions for randomly selecting a subset of said plurality of digital audio data to which to add said predetermined number of bits; and
   instructions for adding said predetermined number of bits to a digital audio data to progressively produce a degraded digital audio data, wherein said predetermined number of bits is added during a successive reproduction of said digital audio data.

48. The computer program product of claim 47 wherein said instructions for selecting comprises:
   instructions for generating a random number; and
   instructions for determining whether to add said predetermined number of bits based upon said random number.

49. The computer program product of claim 48 wherein said predetermined number is selected so that said degraded digital audio data represents approximately 3 dB difference from said digital audio data.

50. The computer program product of claim 49 wherein said predetermined number of bits comprises a least significant bit of said number.

51. The computer program product of claim 50 wherein said predetermined number of bits comprises a most significant bit of said number.

* * * * *